Aug. 7, 1945.   J. A. SWINDLE   2,381,188
CHART CHANGER
Filed April 3, 1943   2 Sheets-Sheet 1

INVENTOR.
John A. Swindle
BY Carlos G. Stratton
ATTORNEY

J. A. SWINDLE  2,381,188
CHART CHANGER
Filed April 3, 1943  2 Sheets-Sheet 2

INVENTOR.
John A. Swindle
BY Carlos G. Stratton
ATTORNEY

Patented Aug. 7, 1945

2,381,188

UNITED STATES PATENT OFFICE 2,381,188

CHART CHANGER

John A. Swindle, Whittier, Calif.

Application April 3, 1943, Serial No. 481,703

7 Claims. (Cl. 271—39)

My invention relates to chart feeding and changing mechanisms; that is, to mechanisms for operation in conjunction with recording meters which measure temperature, pressure, flow of fluids, velocities or other variable quantities.

Among the objects of my invention are:

To provide a chart feeding and changing mechanism which is particularly adapted to feed a series of similar chart sheets or cards at a predetermined rate past a pen or stylus controlled by the recording meter in such a manner that the graph or "curve" produced by the pen or stylus continues from one card to the next without appreciable interruption.

To provide a chart feeding and changing mechanism which enables the graph or curve produced by the recording meter and its pen to continue over a relatively long period of time without necessitating the use of a single long record sheet which must be rolled or folded and is, therefore, difficult to handle or file; instead, the mechanism employs relatively short easily handled chart sheets or cards which are suitable for filing in conventional card filing systems.

To provide a mechanism of this character which by reason of its ability to handle a series of chart cards, each representing a predetermined convenient interval, a continuous record may be obtained without interruption as long as the meter functions; thus, providing a mechanism which is particularly desirable for records which must be maintained day in and day out.

To provide a chart feeding and changing mechanism which by reason of the use of an improved rectangular chart, overcomes the disadvantages inherent in the use of a circular chart by eliminating the need for frequent manual changing of the charts or changing of the charts at any particular time, by permitting the chart scale to be increased for increased accuracy, and by being inherently more intelligible.

To provide a chart feeding and changing mechanism which is particularly simple and economical of manufacture, and of operation, and inherently capable of operation for long intervals without attention.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Figure 1:
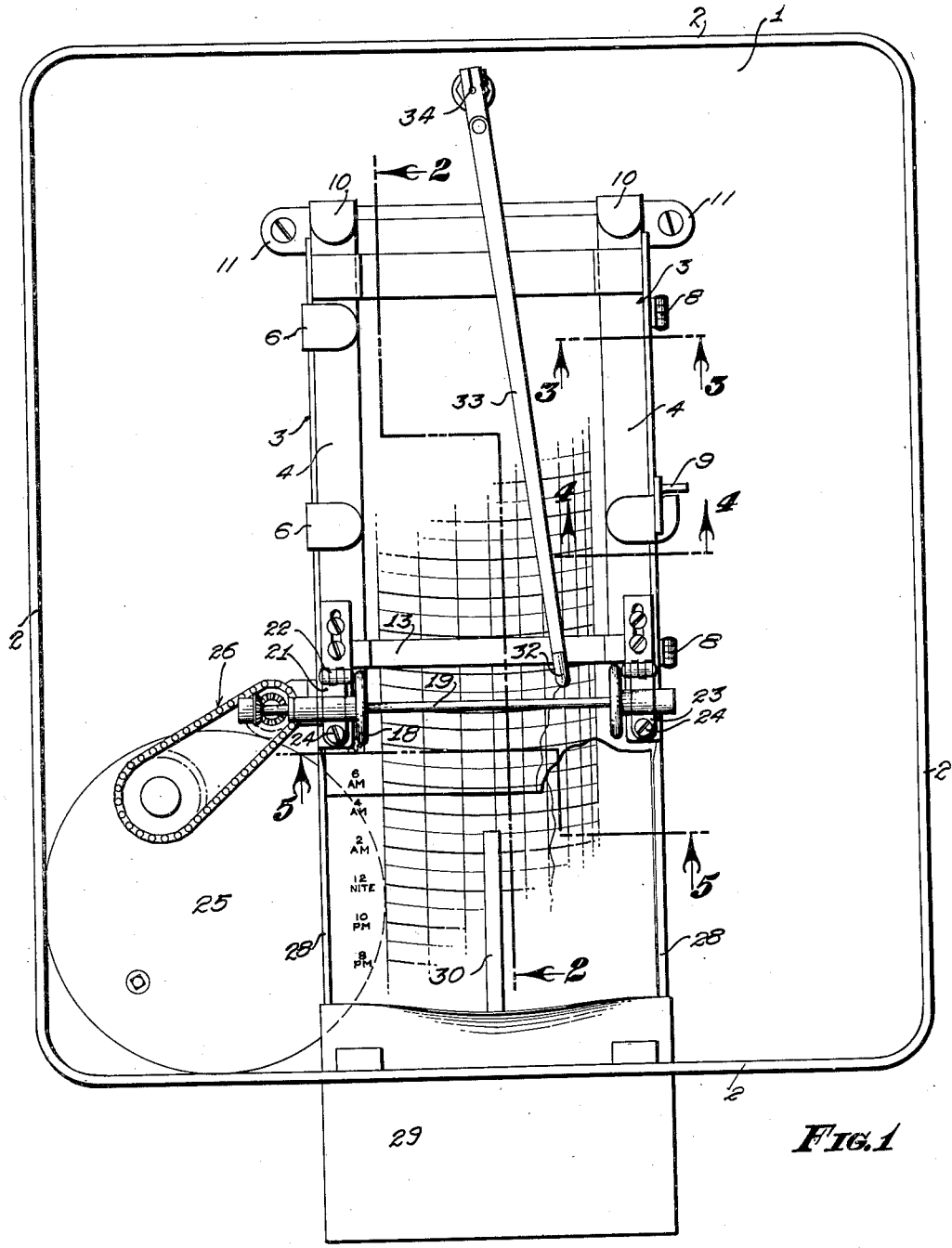
Fig. 1 is an elevational view of the chart feeding and changing mechanism shown mounted within a housing structure.

My chart feeding and changing mechanism is contained within a housing structure, part of which is shown in Fig. 1. The complete housing structure encases the fluid or electric meter or other sensitive element or apparatus, the movements of which it is desired to record. The portion of the housing structure shown includes a rectangular vertical partition 1 bordered by forwardly directed walls 2. A cover plate, not shown, may fit over the extremities of the walls to encase the feeding and changing mechanism therein.

The chart feeding and changing mechanism includes a pair of confronting vertically disposed channel units 3 having forward and rearward flanges 4 and 5. The web of one of the channel units 3 is rigidly secured to its flanges by U-straps 6, while the other forms a door 7 connected to the corresponding rear flanges 5 by hinges 8 and to the forward flange 4 by a latch means 9.

The upper ends of the channel units are closed by U-straps 10 and are joined together by a cross member 11 which projects laterally beyond the channel units 3 to form ears adapted to receive screws which attach the chart feeding and changing mechanism to the partition 1.

The lower portions of the rear flanges turn forwardly to form horizontal brackets which support a bottom member 12, connecting the two channel members. The forward flanges project downwardly over the forward edge of the bottom member 12, to form a clearance space adapted to pass a chart sheet A, to be described hereinafter.

The projecting extremities of the forward flanges are reinforced by the looped ends of a transverse tie member 14 extending therebetween. The tie member may also be secured to the extremities of the rear flanges, below the bottom plate 12. Other cross members 15 connect the rear flanges 5 above the bottom member 12, and a cross member 13 connects the flanges 4 near their lower ends.

The channel members 3, together with the bottom member 12 and U-straps 16, form a magazine for a stack B of the chart sheets A. The door 7 is large enough to accommodate a stack of chart sheets as well as a metal backing plate 16 of approximately the same area as the chart sheets. The stack of chart sheets is held against the forward flanges 4 by a pair of leaf springs 17. The leaf springs 17 extend along the rear flanges 5, their upper ends being clamped to the flanges 5 while their lower ends terminate near the bottom member 12 and bear against the backing plate. The backing plate has a slight bend near its lower end approximately at its line of contact with the leaf springs, so that the backing plate engages the chart sheets principally at their upper and lower extremities, with the greater pressure near the bottom or shelf member 12, so as to urge the chart sheets outwardly thereon.

Figure 2:
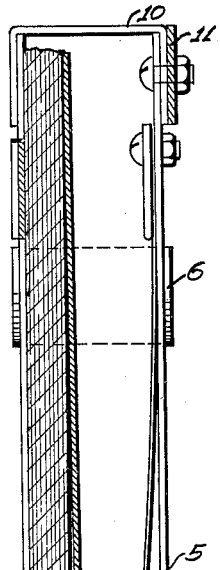
Fig. 2 is an enlarged fragmentary longitudinal sectional view of the chart feeding and changing mechanism taken substantially through 2—2 of Fig. 1, the housing structure being omitted.
Figure 5:
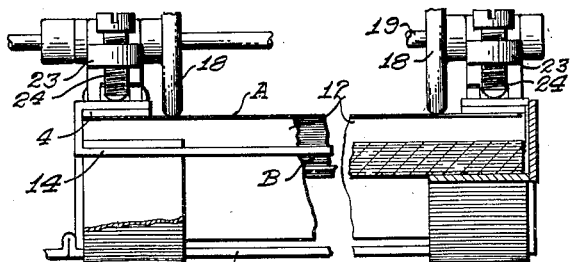
Fig. 5 is a fragmentary transverse sectional view taken through 5—5 of Fig. 1.
Figure 3:
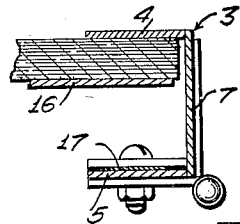
Fig. 3 is a fragmentary cross sectional view through 3—3 of Fig. 1, illustrating the chart magazine door hinge.
Figure 4:
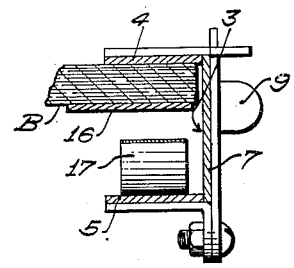
Fig. 4 is another fragmentary cross sectional view through 4—4 of Fig. 1, showing the magazine door latch.
Figure 6:
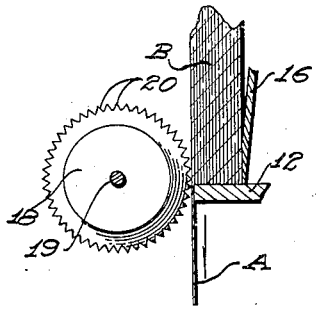
Fig. 6 is a fragmentary sectional view taken in the same plane as Fig. 2, showing a serrated chart feeding wheel which may be used interchangeably with the friction wheel shown in Figs. 1, 2 and 5.

The lower confronting corners of the forward flanges 4 are notched to provide clearance for a pair of feeder wheels 18 mounted on a common axle 19 located outwardly from the bottom member so as to bear against the outermost chart sheet and feed it downwardly across the outer edge of the bottom member. The feeder wheels 18 may have friction surfaces as shown in Figs. 1, 2 and 5, or have peripheral teeth 20, as shown in Fig. 6. The axle 19 is supported by a pair of bearing brackets 21 which extend upwardly and rearwardly to the forward flanges and are secured thereto by adjustable hinges 22. Lugs 23 extend downwardly from the bearing brackets and receive set screws 24 which engage the lower extremities of the forward flange. The set screws 24 permit adjustment of the feeder wheels to accommodate chart sheets of different thickness.

The axle 19 is suitably driven from one end by a spring or electric motor 25 through a sprocket, chain and gear means, indicated generally by 26.

A pair of straps 27 are secured to the rear flanges 5 and extend downwardly therefrom in a forwardly offset plane. Side plates 28 are secured to the laterally outer edges of the straps 27 to form a space adapted to accommodate the chart sheets. A rectangular case 29 about half the length of the chart sheets closed on all sides except its upper end is adapted to fit over the lower ends of the straps 27 and their side plates 28. The case 29 may project below the lower wall 2 of the housing structure, as shown in Fig. 1.

A light leaf spring 30 projects upwardly from the housing and is folded back against itself for yielding contact with the outermost chart sheet stacked against straps 27, the folded portion 31 of the spring forming a guide to direct the chart sheets into position, as indicated by dotted lines in Fig. 2.

Various types of pen or stylus devices may be used depending on the nature of the meter or other sensitive device or apparatus which drives it. The pen or stylus may move rectilinearly or arcuately, the latter arrangement being shown. In the illustration, a pen 32 is mounted on an arcuately movable arm 33 secured to a shaft 34 connected with a suitable sensitive device, not shown. Accordingly, the chart sheets illustrated are divided into arcuately arranged rows which may represent intervals of time. In place of the pen, a metal stylus may be used which marks on a pressure sensitive paper.

In either case, the time-scale divisions of the charts are arranged so that they continue from one to the next; that is, the lower end of one chart sheet is a continuation of the upper end of the preceding chart sheet.

Operation of my chart feeding and changing mechanism is as follows:

The electric or spring motor 25 is adapted to drive the feeder wheels 18 at a constant speed; for example, each chart sheet may represent an interval of twenty-four hours and the wheels are moved at a speed to feed the length of one chart in such an interval.

The parts contacting the charts are smooth as possible to reduce friction and the possibility of error due to slippage of the feeding wheels. This is further avoided by use of the serrated wheel shown in Fig. 6. Also, the clearance between the magazine and the edges of the charts is small to minimize lateral shifting of the chart sheets.

The feeder wheels rotate slowly and continuously, moving a chart sheet downwardly until it clears the stack in the magazine. The chart sheet then drops clear of the wheels into the case 29 and the succeeding chart sheet follows immediately. This continues as long as there are chart sheets in the magazine. A relatively large stack of chart sheets may be provided so that the chart feeding and changing mechanism may run for a week or month, if desired, without attention.

While I have illustrated and described what I now regard as the preferred embodiment of my invention, the construction is, of course, subject to modifications without departing from the spirit and scope of my invention. I, therefore, do not wish to restrict myself to the particular form of construction illustrated and described, but desire to avail myself of all modifications that may fall within the scope of the appended claims.

Having thus described my invention, what I claim and desire to secure by Letters Patent is:

1. In a chart feeding and changing mechanism, the combination of: a magazine adapted to receive a stack of chart sheets and having an abutment at one end thereof for limiting endwise movement of the chart sheets and defining with a side of the magazine a discharge slot for the outermost chart sheet, means in said magazine for urging the stack of chart sheets against said side of the magazine, gravity pressed hinged feeder wheels extending in the said slot to engage the uppermost chart sheet, means to adjust said wheels relative to said chart sheets, means for driving said wheels at a predetermined rate to move the chart sheets one at a time through said slot, and means for collecting chart sheets fed from said magazine.

2. In a chart feeding and changing mechanism, the combination of: a magazine for a stack of chart sheets, said magazine having a discharge slot for the outermost chart sheet, bearing brackets hinged to a side of the magazine, an axle journaled thereby across the magazine outwardly from said slot, a pair of feeder wheels carried by said axle and positioned to engage the outermost chart sheet along its side margins, means for driving said axle at a predetermined rate to move the outermost chart sheet through said slot and from said magazine, and means for receiving chart sheets as they are fed from the magazine.

3. In a chart feeding and changing mechanism, the combination of: a magazine for a stack of chart sheets having a shelf for supporting the chart sheets on edge, means yieldingly urging the stack of sheets against a side of the magazine, the bottom of said side forming with the adjacent edge of said shelf a slot adapted to pass the outermost sheet, a pair of hinges each comprising a butt mounted on said magazine and a bracket hinged to said butt, feeder wheel means journaled in said brackets and extending into said slot and positioned to engage initially the bottom of the outermost chart sheet, feed said chart sheet through said slot until clear thereof and thereupon engage the succeeding chart sheet and continue to feed the sheets in succession from said magazine.

4. In a chart feeding and changing mechanism, the combination of: a magazine for a stack of chart sheets having a shelf for supporting the stack of sheets on edge, means to urge the bottom of the stack against a side of the magazine, the bottom of said side forming with the adjacent edge of said shelf a slot adapted to pass the outermost sheet, feeder wheels extending into said slot to engage the lower extremity of said outermost sheet, a common axle for said wheels and bearing brackets hinged to said magazine for journaling said axle, and means to limit the movement of said wheels toward said shelf.

5. In a chart feeding and changing mechanism, the combination of: a magazine for a stack of chart sheets, a shelf in said magazine for supporting a stack of chart sheets on edge, means urging the stack of sheets against a side of the magazine, the bottom of said side forming with the adjacent edge of said shelf a slot adapted to pass the outermost chart sheet, feeder wheels extending into said slot and positioned initially to engage the bottom of the outermost chart sheet and feed said sheet through said slot until clear thereof, adjustable means mounting said feeder wheels, a chart sheet receiver to receive the sheets as they pass from said magazine and means to operate said wheels.

6. In a chart feeding and changing mechanism, the combination of: a magazine for a stack of chart sheets having a shelf at the bottom for supporting a stack of chart sheets on edge, retainer elements extending along the side margins of the outermost sheet and defining with the adjacent edge of the shelf a space for the discharge from the magazine of said outermost chart sheet, a pair of wheels positioned laterally outwardly from the edge of said shelf, yielding means urging the bottom of the stack outwardly whereby the outermost sheet is held in contact with said wheels, means for pivotally mounting said wheels to cause same to bear gravitationally against said outermost sheet, means to regulate the gravitational pressure of said wheels against said sheet, means for driving said wheels to feed said outermost sheet from said magazine, and means for collecting chart sheets as they issue from the magazine.

7. In a chart feeding and changing mechanism, the combination of: a magazine for a stack of chart sheets provided with a slot in the bottom thereof through which individual sheets are successively dispensed, means urging the bottom of the stack against a side of the magazine to aline the outermost sheet with said slot, and means for continuously and successively moving each said sheet through said slot, comprising wheels extending into said slot and frictionally engaging the face of the forward sheet of the stack, a shaft mounting said wheels, hinge butts secured to the front of the magazine, brackets pivoted on said butts and journaling said shaft, said butts being adjustable to regulate the position of said brackets and wheels relative to said slot, said brackets extending outwardly from the front of said magazine and from the axis of the hinge pivots to cause said wheels to bear by the weight thereof against said outermost sheet, and means for driving said wheels.

JOHN A. SWINDLE.